G. KENNECK.
CONVEYER BELT.
APPLICATION FILED APR. 1, 1919.
1,354,493.
Patented Oct. 5, 1920.
2 SHEETS—SHEET 1.
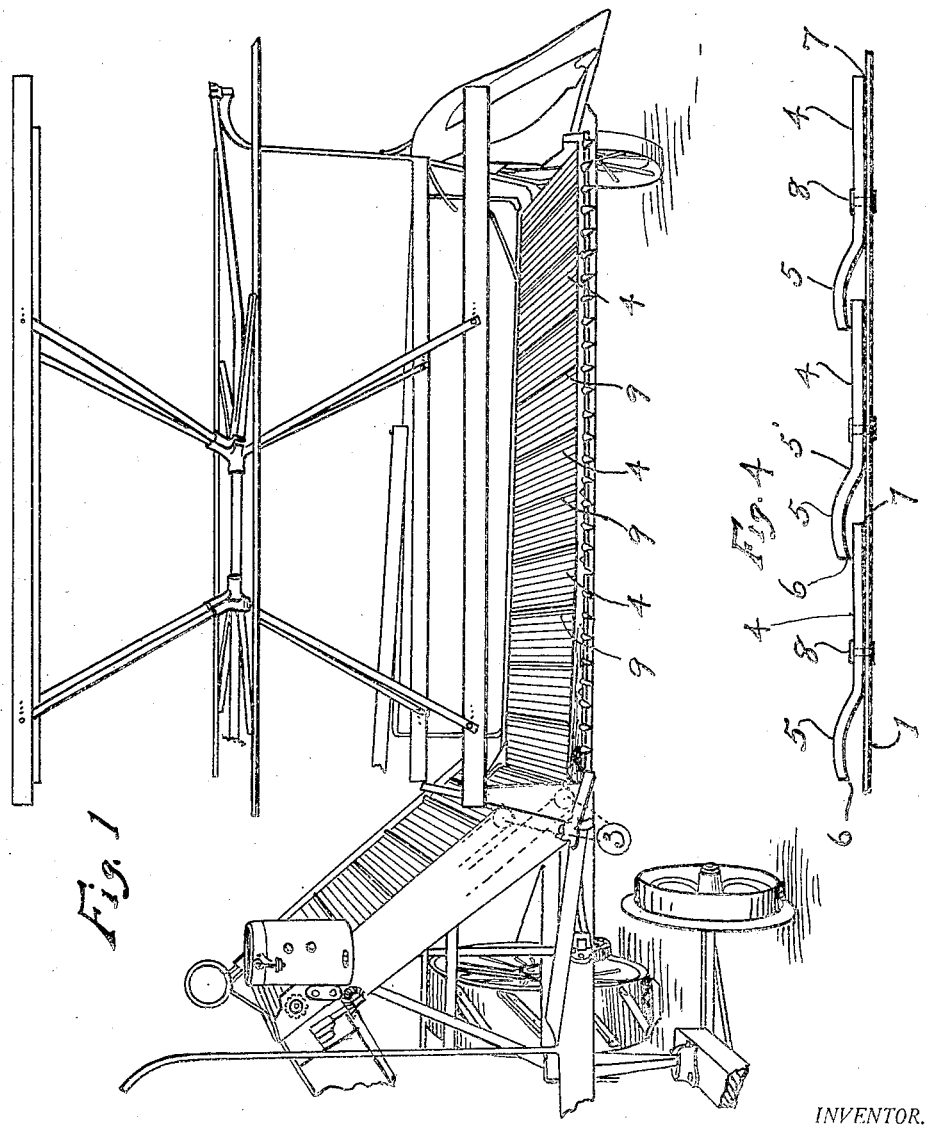
INVENTOR.
George Kenneck
BY
U. Y. Charles
ATTORNEY.

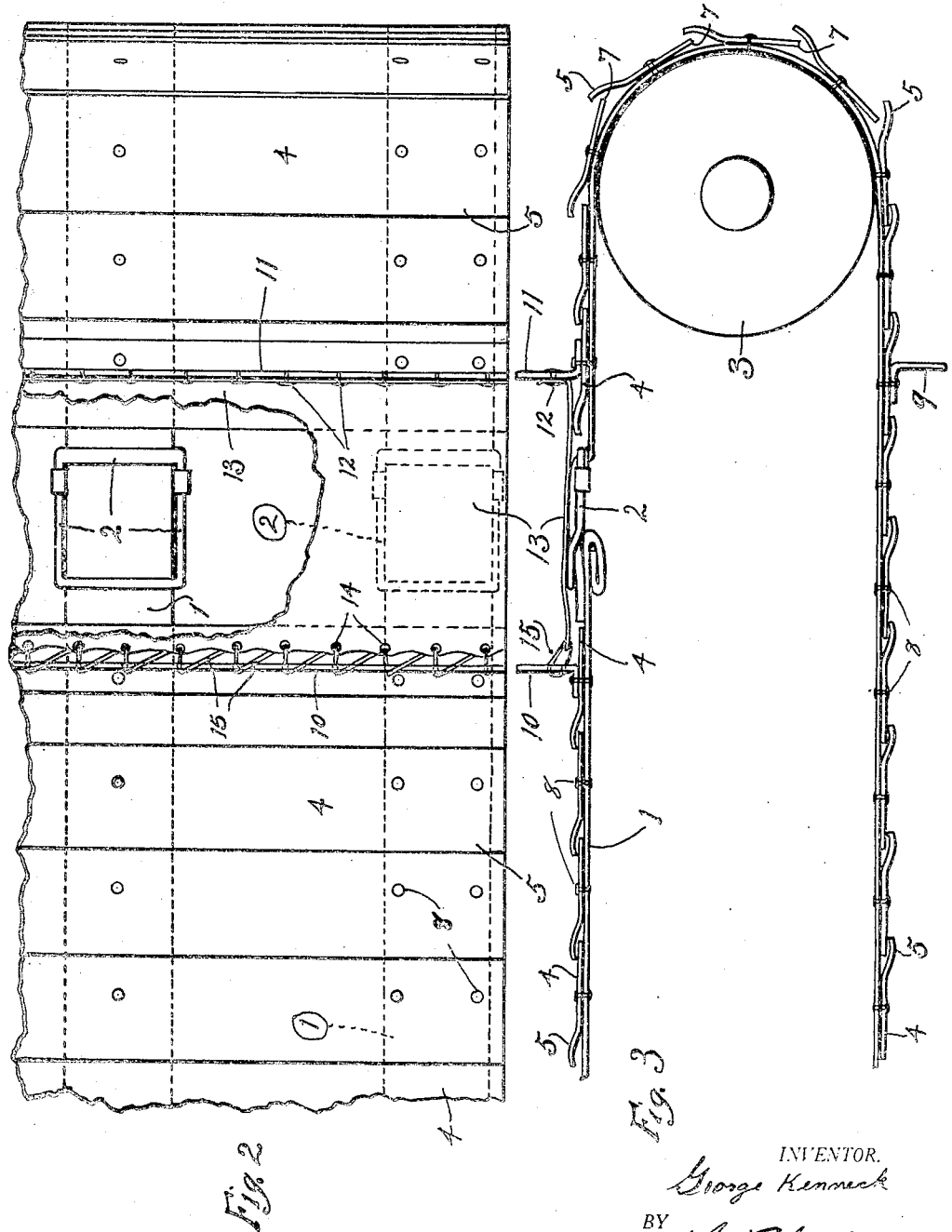

UNITED STATES PATENT OFFICE.

GEORGE KENNECK, OF GATE, OKLAHOMA.

CONVEYER-BELT.

1,354,493.  Specification of Letters Patent.  Patented Oct. 5, 1920.

Application filed April 1, 1919. Serial No. 286,683.

*To all whom it may concern:*

Be it known that I, GEORGE KENNECK, a citizen of the United States, and a resident of Gate, in the county of Beaver and State of Oklahoma, have invented certain new and useful Improvements in Conveyer-Belts, of which the following is a description, referring to the drawings which form a part of this specification.

My invention relates to "endless" belt conveyers, and has particular reference to conveyers of harvesting machines.

All conveyers in common use as elements of harvesting machines consist of a fabric belt provided with transverse wooden cleats. The fabric belt is subject to alternate stretching and shrinking when wet by rain and then drying out. Moreover, fabric belts which extend the full width of the conveyer sag in the middle when overloaded with material, and have other objectionable features known to users.

Wooden crossbars in such conveyers, warp, split and rot under the action of rain, sun and atmospheric changes. It is thus apparent that conveyers made entirely of fabric and wood do not give as long and satisfactory service as is desirable.

The objects of my invention are: to provide a conveyer structure that will be practically weather-proof and very durable; to provide a conveyer structure having sufficient transverse rigidity to withstand load stresses; and to provide a conveyer structure through which shattered grain or straw can not pass. One advantage attained through my invention consists in the fact that its materials (except the belts) are all metal whereby the parts to be assembled do not have to be carried from woodworking shops, etc., to the assembling room: thus effecting an economy in manufacture.

The invention consists in the matters pointed out in the appended claims and illustrated in the accompanying drawings, in which:—

Figure 1 is a perspective of a grain harvester provided with one or more conveyers embodying the invention. Fig. 2 is a detail plan of a small portion of the conveyer adjacent one edge thereof, showing the cover 13 partly broken away to expose a belt buckle. Fig. 3 is a side elevation of the parts shown in Fig. 2, also a roller. Fig. 4 is a detail end view of several of the metallic cross-members composing the bed or traveler of the conveyer.

Referring to Figs. 2 and 3:—This conveyer comprises a suitable number of narrow belts 1, the ends of which are adjustably connected by friction-buckles 2 of known construction. Said belts pass over the usual supporting rollers 3, power being applied as usual to one roller to drive the conveyer.

The body of the conveyer is composed of interlapped, galvanized sheet iron transverse members 4, hereinafter called plates or strips. These plates are quite narrow in proportion to their length, which is equal to the width of the conveyer. Each of said plates comprises a flat portion 4 and a slightly raised lip 5 which is formed by bending the plate longitudinally near one of its edges as shown at 5', while the lip portion 5 has a slight convex curvature as shown, and the edge of said lip is sufficiently raised to permit the contiguous plate 4 to lie between said edge and the belts 1, as clearly shown. Each lip 5 overlaps the adjacent plate 4 by a fraction of an inch.

The said curvature of the plate 4 will increase its longitudinal bending strength, which is advantageous. The raised positions of the lip edges 6, permit all the plates to lie in the same plane, as shown, so that the inner edges 7 will not tend to cut the belts.

Each plate 4 is flexibly secured to each of the belts 1 with rivets 8, or in any preferred manner.

The flights 9, which I prefer to make from galvanized angle-iron or bent sheet iron, are riveted to certain of the plates 4 at regular intervals and have the usual function. The flights moreover serve as braces to the traveling structure, they being very rigid due to their angular section.

The series of interlapped plates 4 provides a continuous bed for the material carried, and such a bed as will not permit the falling through of "shattered" grain or straw. Also, the interlapping of the plates will very largely protect the belts 1 from rain and its effects.

One break in the continuity of the series of plates 4 is necessary, owing to the fact that the belts 1 have ends which are fastened with buckles, access to which must be had from the outside. To provide such access I omit two of said plates and rivet two anglebars 10 11 to the adjacent plates 4. Each angle-bar 10 11 has a row of perforations. One said row of perforations receives rivets 12, by which one edge of a flexible cover 13 is fastened to bar 11. Canvas is a suitable material for this cover. The opposite edge of the cover is provided with eyelets 14, and is fastened to the other angle-bar 10 with a lacing 15. Normally, said cover forms a portion of the conveyer bed, and when the belts require tightening it is a simple matter to undo the lacing and lay back the cover to give access to the buckles 2.

There is no friction between adjacent plates 4 when they pass around a roller, as the lips 5 stand clear of the adjacent plates as shown in Fig. 3.

Minor modifications may be resorted to without departing from the spirit of the invention.

Having now described my invention, I claim as new and desire to secure by Letters Patent:—

A conveyer comprising a plurality of belts, each having a connecting device to make the belt endless; a conveyer bed composed of contacting transverse pieces fastened upon the belts; one or more of said pieces being omitted over said connecting devices; a sheet of suitable material adapted to cover the gap formed by the omission of said piece or pieces, one edge of said sheet being fastened to one of the transverse pieces; and means for detachably fastening the opposite edge of said cover-sheet to the transverse piece at the other side of the gap.

GEORGE KENNECK.

Witnesses:
N. M. PORTER,
JOSEPH KENNECK.